(12) United States Patent
Nair et al.

(10) Patent No.: US 8,819,562 B2
(45) Date of Patent: Aug. 26, 2014

(54) QUICK CONNECT AND DISCONNECT, BASE LINE CONFIGURATION, AND STYLE CONFIGURATOR

(75) Inventors: Ajay N. Nair, Bangalore (IN); Sundaramoorthi Jhangavel, Bangalore (IN); Manjesh Bharati, Bangalore (IN); Jerry Marti, West Salem, OH (US)

(73) Assignee: Honeywell International Inc., Morristown, NJ (US)

( * ) Notice: Subject to any disclaimer, the term of this patent is extended or adjusted under 35 U.S.C. 154(b) by 395 days.

(21) Appl. No.: 12/895,609

(22) Filed: Sep. 30, 2010

(65) Prior Publication Data
US 2012/0084660 A1    Apr. 5, 2012

(51) Int. Cl.
*G06F 3/048*    (2013.01)

(52) U.S. Cl.
USPC .......................................................... 715/738

(58) Field of Classification Search
USPC ................................................. 715/738, 745
See application file for complete search history.

(56) References Cited

U.S. PATENT DOCUMENTS

| | | | |
|---|---|---|---|
| 4,375,637 | A | 3/1983 | Desjardins |
| 4,816,208 | A | 3/1989 | Woods et al. |
| 5,042,265 | A | 8/1991 | Baldwin et al. |
| 5,161,387 | A | 11/1992 | Metcalfe et al. |
| 5,385,297 | A | 1/1995 | Rein et al. |
| 5,390,206 | A | 2/1995 | Rein et al. |
| 5,544,036 | A | 8/1996 | Brown, Jr. et al. |
| 5,768,119 | A | 6/1998 | Havekost et al. |
| 5,929,761 | A | 7/1999 | Van der Laan et al. |
| 5,946,303 | A | 8/1999 | Watson et al. |
| 5,955,946 | A | 9/1999 | Beheshti et al. |
| 5,963,940 | A | * 10/1999 | Liddy et al. ........................... 1/1 |
| 6,124,790 | A | 9/2000 | Golov et al. |
| 6,141,595 | A | 10/2000 | Gloudeman et al. |
| 6,178,362 | B1 | 1/2001 | Woolard et al. |
| 6,185,483 | B1 | 2/2001 | Drees |
| 6,195,309 | B1 | 2/2001 | Ematrudo |
| 6,223,544 | B1 | 5/2001 | Seem |

(Continued)

FOREIGN PATENT DOCUMENTS

| WO | WO 01/97146 | 12/2001 |
|---|---|---|
| WO | WO 02/052432 | 7/2002 |

(Continued)

OTHER PUBLICATIONS

U.S. Appl. No. 12/895,640, filed Sep. 30, 2010.

(Continued)

*Primary Examiner* — Phenuel Salomon
(74) *Attorney, Agent, or Firm* — Seager, Tufte, Wickhem LLC (57) ABSTRACT

For a quick connect, a user may receive a list of available groups, select a particular group, and provide site number and controller number for a station/platform to be identified and connected. For a quick disconnect, user may have a list of all active stations/platforms from which to select for disconnect, including an option to disconnect all stations/platforms at once. A style configurator user interface may be invoked, which can populate a window with colors selected for menu bar, tool bar, and like components. A menu option may be provided in the tool bar where user can change the baseline from an old station configuration to a new station configuration. Thus, when user creates a new site controller, the configuration file may reflect control strategies and configuration updates added before as the new baseline.

8 Claims, 11 Drawing Sheets

(56) References Cited

U.S. PATENT DOCUMENTS

| | | | |
|---|---|---|---|
| 6,295,526 B1 | 9/2001 | Kreiner et al. | |
| 6,295,527 B1 | 9/2001 | McCormack et al. | |
| 6,314,328 B1 | 11/2001 | Powell | |
| 6,351,213 B1 | 2/2002 | Hirsch | |
| 6,356,282 B2 | 3/2002 | Roytman et al. | |
| 6,389,464 B1* | 5/2002 | Krishnamurthy et al. | 709/220 |
| 6,420,968 B1 | 7/2002 | Hirsch | |
| 6,430,712 B2 | 8/2002 | Lewis | |
| 6,466,654 B1* | 10/2002 | Cooper et al. | 379/88.01 |
| 6,473,407 B1 | 10/2002 | Ditmer et al. | |
| 6,492,901 B1 | 12/2002 | Ridolfo | |
| 6,535,122 B1* | 3/2003 | Bristol | 340/506 |
| 6,549,135 B2 | 4/2003 | Singh et al. | |
| 6,643,355 B1* | 11/2003 | Tsumpes | 379/45 |
| 6,643,516 B1* | 11/2003 | Stewart | 455/456.6 |
| 6,675,591 B2 | 1/2004 | Singh et al. | |
| 6,681,156 B1 | 1/2004 | Weiss | |
| 6,690,980 B2* | 2/2004 | Powell | 700/80 |
| 6,813,587 B2* | 11/2004 | McIntyre et al. | 702/183 |
| 6,816,811 B2 | 11/2004 | Seem | |
| 6,832,120 B1 | 12/2004 | Frank et al. | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,938,033 B1* | 8/2005 | Schutzer | 1/1 |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,009,510 B1* | 3/2006 | Douglass et al. | 340/531 |
| 7,024,283 B2 | 4/2006 | Bicknell | |
| 7,026,925 B2* | 4/2006 | Roche et al. | 340/531 |
| 7,031,880 B1* | 4/2006 | Seem et al. | 702/182 |
| 7,031,957 B2* | 4/2006 | Harris | 707/608 |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,183,907 B2 | 2/2007 | Simon et al. | |
| 7,243,044 B2 | 7/2007 | McCalla | |
| 7,250,856 B2 | 7/2007 | Havekost et al. | |
| 7,272,452 B2 | 9/2007 | Coogan et al. | |
| 7,277,018 B2* | 10/2007 | Reyes et al. | 340/573.1 |
| 7,320,023 B2 | 1/2008 | Chintalapati et al. | |
| 7,345,580 B2 | 3/2008 | Akamatsu et al. | |
| 7,379,997 B2 | 5/2008 | Ehlers et al. | |
| 7,457,869 B2 | 11/2008 | Kernan | |
| 7,460,020 B2 | 12/2008 | Reyes et al. | |
| 7,490,319 B2 | 2/2009 | Blackwell et al. | |
| 7,496,911 B2 | 2/2009 | Rowley et al. | |
| 7,565,225 B2 | 7/2009 | Dushane et al. | |
| 7,596,613 B2 | 9/2009 | Silverthorne et al. | |
| 7,644,371 B2 | 1/2010 | Robertson et al. | |
| 7,653,459 B2 | 1/2010 | Pouchak et al. | |
| 7,734,572 B2 | 6/2010 | Wiemeyer et al. | |
| 7,774,457 B1 | 8/2010 | Talwar et al. | |
| 7,819,334 B2 | 10/2010 | Pouchak et al. | |
| 7,826,929 B2 | 11/2010 | Wacker | |
| 7,870,090 B2 | 1/2011 | McCoy et al. | |
| 7,904,186 B2* | 3/2011 | Mairs et al. | 700/83 |
| 7,978,665 B1* | 7/2011 | Jaynes et al. | 370/338 |
| 8,090,477 B1 | 1/2012 | Steinberg | |
| 8,112,162 B2 | 2/2012 | Pouchak et al. | |
| 8,190,273 B1 | 5/2012 | Federspiel et al. | |
| 8,218,570 B2 | 7/2012 | Moran et al. | |
| 8,224,466 B2 | 7/2012 | Wacker | |
| 8,224,763 B2 | 7/2012 | Guralnik et al. | |
| 8,224,888 B2 | 7/2012 | Brindle | |
| 8,239,500 B2 | 8/2012 | Pouchak | |
| 8,335,593 B2 | 12/2012 | Johnson et al. | |
| 8,352,047 B2 | 1/2013 | Walter | |
| 2002/0152298 A1 | 10/2002 | Kikta et al. | |
| 2003/0078677 A1 | 4/2003 | Hull et al. | |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2004/0230328 A1 | 11/2004 | Armstrong et al. | |
| 2005/0038571 A1 | 2/2005 | Brickfield et al. | |
| 2005/0043862 A1 | 2/2005 | Brickfield et al. | |
| 2005/0143863 A1 | 6/2005 | Ruane et al. | |
| 2005/0193285 A1 | 9/2005 | Jeon | |
| 2005/0203490 A1 | 9/2005 | Simonson | |
| 2005/0222889 A1 | 10/2005 | Lai et al. | |
| 2006/0038672 A1 | 2/2006 | Schoettle | |
| 2006/0064305 A1 | 3/2006 | Alonso | |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2007/0061046 A1* | 3/2007 | Mairs et al. | 700/275 |
| 2007/0198674 A1 | 8/2007 | Li et al. | |
| 2008/0010049 A1 | 1/2008 | Pouchak et al. | |
| 2008/0189162 A1 | 8/2008 | Ganong et al. | |
| 2009/0113037 A1 | 4/2009 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0198651 A1 | 8/2010 | Johnson et al. | |
| 2010/0286937 A1 | 11/2010 | Hedley et al. | |
| 2011/0010654 A1 | 1/2011 | Raymond et al. | |
| 2011/0083077 A1 | 4/2011 | Nair et al. | |
| 2011/0093493 A1 | 4/2011 | Nair et al. | |
| 2011/0098863 A1 | 4/2011 | Miki | |
| 2011/0113360 A1 | 5/2011 | Johnson et al. | |
| 2011/0196539 A1 | 8/2011 | Nair et al. | |
| 2011/0225580 A1 | 9/2011 | Nair et al. | |
| 2011/0298608 A1 | 12/2011 | Ranjan et al. | |
| 2011/0316688 A1 | 12/2011 | Ranjan et al. | |
| 2012/0005731 A1 | 1/2012 | Lei et al. | |
| 2012/0166992 A1 | 6/2012 | Huynh et al. | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Tridium, "Tridium & Niagara Framework Overview," 9 pages, prior to Oct. 28, 2008.
Tridium, "NiagaraAX Product Model Overview," 7 pages, 2005.
Adobe Acrobat 6.0 Standard, Version 6.0.2, Screenshots, 2 pages, May 18, 2004.
Atere-Roberts et al., "Implementation of a Computerized Maintenance Management System for the City of Atlanta," 13 pages, Proceedings of the Water Environment Federation, Jan. 1, 2002.
Business Objects, Crystal Reports Acess, Format, and Integrate Data, 4 pages, Dec. 2003.
U.S. Appl. No. 13/402,780, filed Feb. 22, 2012.
U.S. Appl. No. 13/657,620, filed Oct. 22, 2012.
Honeywell Spyder Bacnet User's Guide, 242 pages, Revised Jul. 2009.
Honeywell Spyder User's Guide 202 pages, Released Jul. 2007.
Honeywell, "ComfortPoint Open BMS Release 100," Specification and Technical Data, 13 pages, Jun. 2012.
Honeywell, "Excel Building Supervisor-Integrated R7044 and FS90 Ver. 2.0," Operator Manual, 70 pages, Apr. 1995.
Honeywell, "Excel 15B W7760B Building Manager," User's Guide, 84 pages, Revised Jan. 2005.
http://blogs.msdn.com/b/khen1234/archive/2005/05/11/416392.aspx, "Regular Expressions in T-SQL," 4 pages, May 11, 2005.

(56) References Cited

OTHER PUBLICATIONS http://en.wikipedia.org/wiki/JAR_(file_format), "JAR (file Format)—Wikipedia, the Free Encyclopedia," 3 pages, printed Dec. 26, 2009.
http://www.de2m.com/DE2R_Technical.html, "Data Enabled Enterprise Repository (DE2R) Technical Overview," 4 pages, printed Mar. 8, 2013.
http://www.google.com/maps, "Google Maps, Pin Location," 1 page, prior to Nov. 21, 2008.
Johnson Controls, "Fx Workbench, User's Guide," 818 pages, issued May 19, 2008, (this article will be uploaded to USPTO website in 5 parts).
Microsoft Word Screen Shots, 2 pages, prior to Nov. 21, 2008.
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.
Siemens, BACnet for DESIGO 27 pages, prior to Dec. 30, 2009.
Trane, "System Programming, Tracer Summit Version 14, BMTW-SVP01D-EN," 623 pages, 2002.

* cited by examiner

QUICK CONNECT AND DISCONNECT, BASE LINE CONFIGURATION, AND STYLE CONFIGURATOR

BACKGROUND

The present disclosure pertains to stations and platforms and particularly to actions relative to the stations and platforms.

SUMMARY

The disclosure reveals quick connect, quick disconnect, style configurator and baseline change actions for station/platform systems. For the quick connect, a user interface may be provided with a list of groups available. After selecting a particular group, the user may need to provide site and controller numbers. Based on these values, a station may be identified and connected. For a quick disconnect, a user interface may be provided with a list of all active station/platform connections. Using this list, the user may select a set of stations/platforms that the user wants to disconnect. There may be an option to disconnect all stations/platforms at one go or action. A user may invoke the style configurator user interface, which can populate a window with a relevant color chosen to be applied for different components like a menu bar, tool bar, navigator bar, view bar and scroll bar. The color scheme dialog may contain the buttons such as preview, reset styles, save default styles and cancel. The preview button may show a preview of the style configuration. The reset styles button may reset the style and/or revert to the default settings. The save button may save a user profile. A new menu option may be provided in the tool bar where a user can change the baseline from the old configuration file to a new configuration file. Thus, the next time the user creates a new site controller, the configuration file may reflect control strategies added before as the baseline.

DESCRIPTION

A "quick connect" is an aspect of the present disclosure may help a user to connect to a specific site virtually instantly without navigating through an entire tree hierarchy. There may be thousands of deployed sites and it may be time consuming for the user to manually browse the hierarchy looking for the desired site for connection. Using the quick connect feature, the user may connect to deployed stations/platforms virtually instantly by providing the group name, site number and XCM number. The group number and XCM number are remembered and not required on subsequent usage; therefore, only the site number entry is required.

A "quick disconnect" is another aspect of the present disclosure. After connecting to the stations/platforms, if the user wants to disconnect the stations/platforms to release network communication resources, the user may need to navigate the tree of sites to find and disconnect the connections one after another. It may lead to a tedious task if the user wants to disconnect large number of stations/platforms. Using the quick disconnect feature, the user may disconnect all or a set of stations/platforms at one go. This aspect may be invoked from a tool menu that shows a dialog of all connected stations. The present approach may allow a user to select all, one or multiple stations to do a disconnection of such platform and station connections.

The default Niagara™ workbench does not necessarily provide the user an option to select specific visual style theme for the workbench. The user may have to use the default theme provided by Niagara™. A style configurator may provide an improvement to the user interface (UI) where the user can select a specific theme, background and font for the Opus™ workbench.

In Opus™ Supervisor, when a user creates a new offline XCM (site controller), a default station configuration may be used as the default initial configuration set up. This default station configuration is referred to as the baseline. At times, the user may add a new control strategy or station configuration improvements to a station configuration and require this new station configuration to be made as the baseline to be used while creating a new XCM. The present aspect may be invoked from a tool menu to make the baseline configuration for that particular new XCM station configuration which has been selected by the user.

With a quick connect, to connect to a downloaded station, the user may need to give a group name, site number and XCM number. Using this information, the downloaded stations may be identified and connected. In this way, the user does not necessarily have to browse through an entire Opus™ Enterprise hierarchy.

With a quick disconnect, a UI may be provided with a list of all active station/platform connections. Using this list, the user may select a set of stations/platforms that the user wants to disconnect. There may be an option to disconnect all stations/platforms at one go or action.

The users may be able to change theme colors and font size in the workbench using a style configurator menu option provided in the tool bar. A dialog box may contain various color and font options, which a user can select to change the appearance of the workbench. Once the user invokes the style configurator UI, the UI may populate a window with the relevant color chosen to be applied for the different components like a menu bar, tool bar, navigator bar, view bar and scroll bar.

A color scheme dialog may contain the following buttons for preview, reset styles, save default styles and cancel. The preview button may show a preview of the style configuration. The reset styles button may reset the style and revert it to the default settings. The save button may save the new user selected theme profile.

Verification criteria may include default color and font sizes as follows: Font Style [Heading]: default=bold, Tahoma; Font Size [Heading]: default=11pt; Font Style [Text]: default=Tahoma; Font Size [Text]: default=11pt; Background Color: default=#fff2f2f2; ControlShadow Color: default=#25587E; Foreground Color: default=#ff000000; WindowBackground Color: default=#ffffffff; WindowForeground Color: default=#ff000000; SelectionBackground Color:

default=#306754; DropOkForeground Color: default=#ffffffff; and Control Auxiliary Color: default=#ddf0fe.

The next time a user performs a login, the user may get the specific style and theme to the workbench that the user had saved before. The color scheme dialog box may be a client side specific aspect. Once a user saves his/her style settings with the "save" button available on the style configurator dialog box, the settings may be saved in an XML file under the workbench Niagara™ home directory. When a user re-logs into the same machine, the saved XML file containing the desired style settings may be parsed and set for that user.

The change baseline aspect may help a user to replace an old baseline configuration file with a new file which has new control strategies or configurations implemented. Once the baseline is done, a creation of a new XCM may create the new station configuration from the new baseline station configuration. Thus, the user will not necessarily be forced to re-create the same control strategies and configuration updates in the new XCM station each time.

For the quick connect, a UI may be provided with a list of groups available. After selecting a particular group, the user may have to provide a site number and XCM number. Based on these values, a station may be identified and connected. One may refer to FIG. 1 relative to the quick connect approach.

Figure 1:
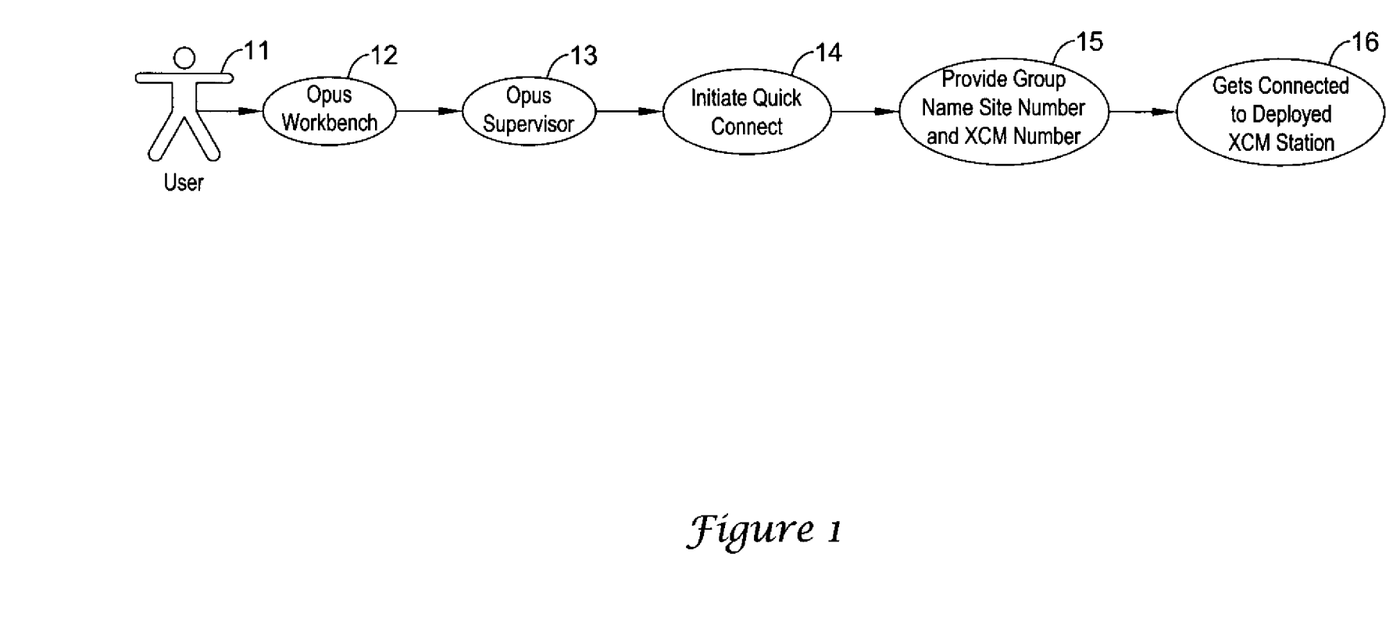
FIG. 1 is a flow diagram for a quick connect.

FIG. 1 is a diagram showing a quick connect by a user 11. User 11 may open an Opus™ Workbench 12 and then an Opus™ Supervisor 13. A quick connect may be initiated at symbol 14. A group name site number and an XCM number may be provided at symbol 15. Then a connection is got to a deployed XCM station at symbol 16.

For a quick disconnect, a UI may be provided with the list of all active station/platform connections. Using this list, the user may select a set of stations/platforms that the user wants to disconnect. There may be an option to disconnect all stations/platforms at one go or action. One may refer to FIG. 2 on the quick disconnect approach.

Figure 2:
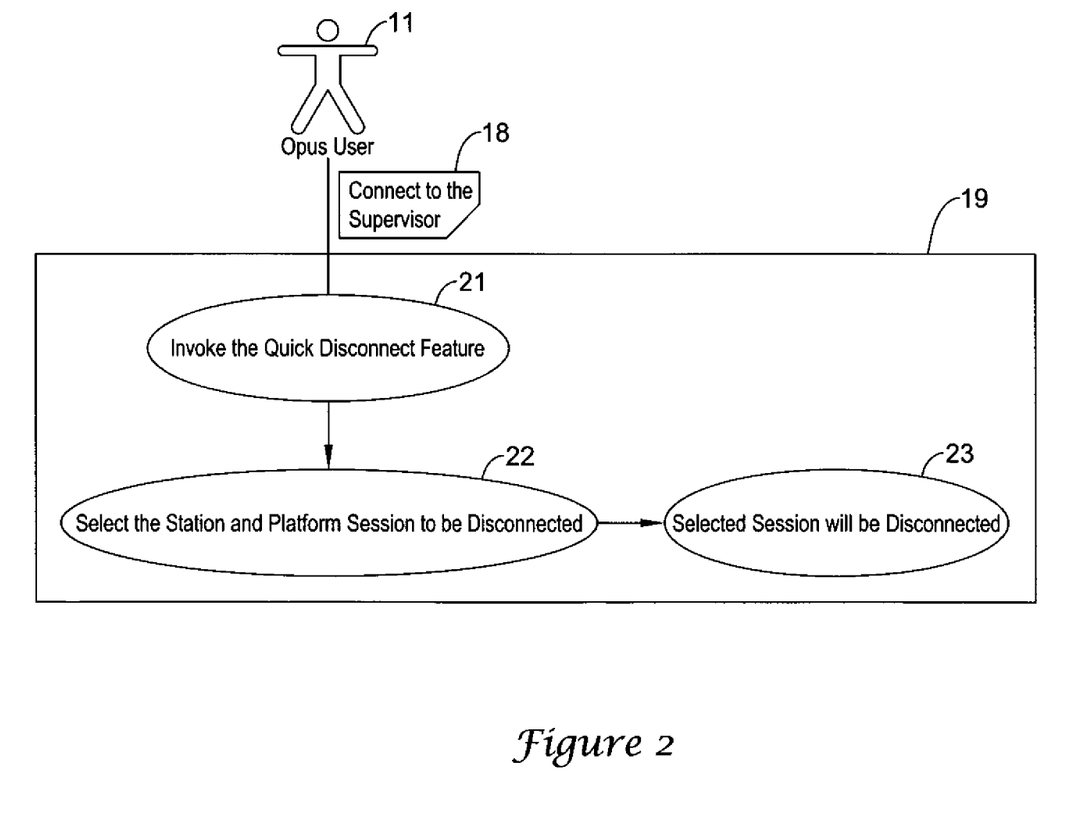
FIG. 2 is a flow diagram for a quick disconnect.

FIG. 2 is a diagram showing a quick disconnect. An Opus™ user 11 may connect to a Supervisor 19 at symbol 18. The quick disconnect feature may be invoked at symbol 21. Then user 11 may select the station and platform session to be disconnected at symbol 22. The selected session may as a result be disconnected at symbol 23.

A user may invoke the style configurator UI, which can populate a window with a relevant color themes chosen to be applied for different components like a menu bar, tool bar, navigator bar, view bar and scroll bar.

The color theme dialog may contain the buttons such as preview, reset styles, save default styles and cancel. The preview button may show a preview of the style configuration. The reset styles button may reset the style and/or revert to the default settings. The save button may save the user style profile. One may refer to FIG. 3 relative to the style configurator.

Figure 3:
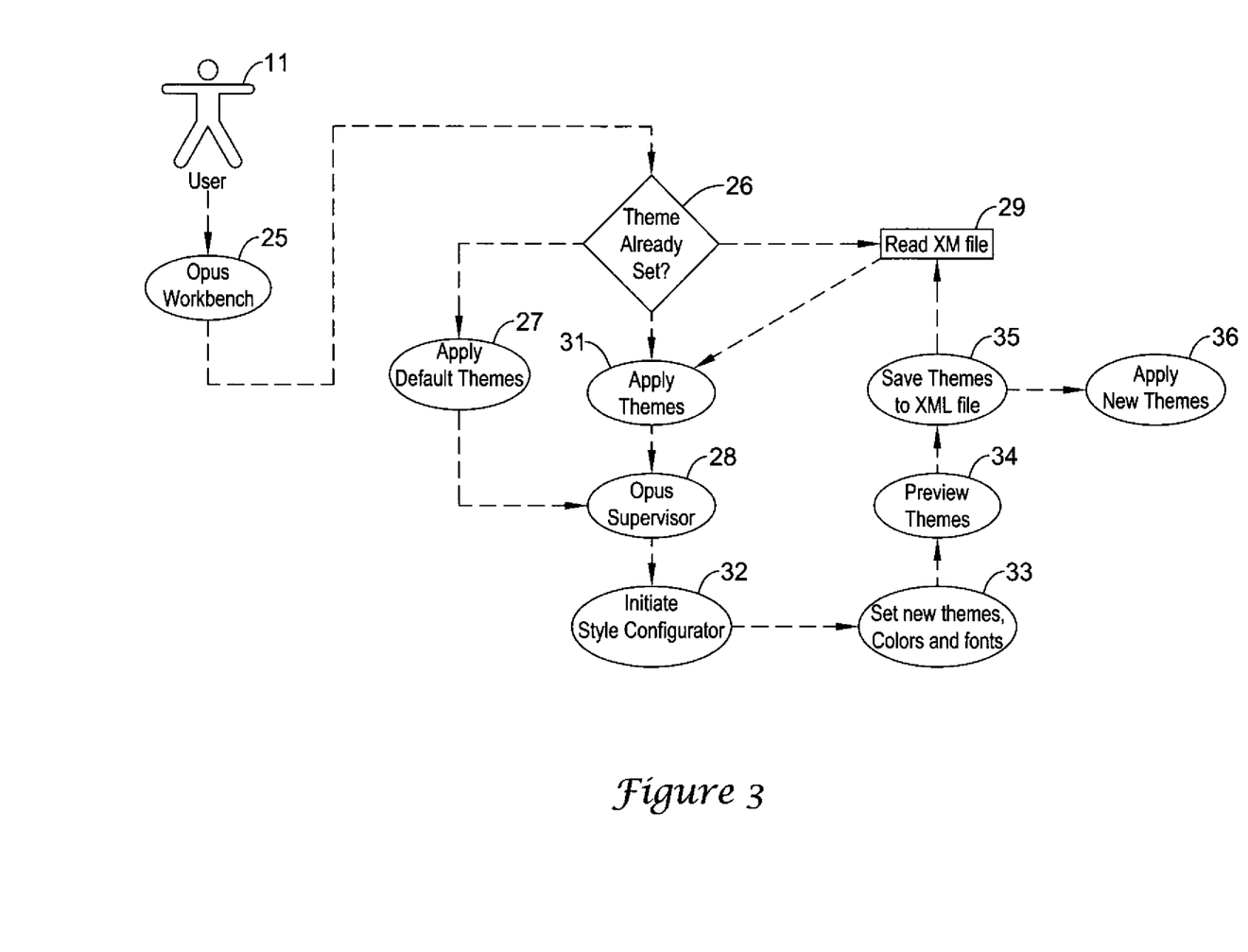
FIG. 3 is a diagram showing an approach for a style configurator.

FIG. 3 is a diagram showing an approach for a style configuration. User 11 may go to the Opus™ Workbench at symbol 25. A question of whether a theme is already set may be asked at symbol 26. The decision at symbol 26 may be just to see if an XML file exists. If the answer is no, then default themes may be applied according to symbol 27 to the Opus™ Supervisor at symbol 28, or alternatively themes may be read from an XML file at symbol 29. If the answer is yes to the question at symbol 26, then at symbol 31 the themes read from XML file at symbol 29 may be applied to the Opus™ Supervisor at symbol 28. After theme application, a style configurator may be initiated at symbol 32. New themes, colors and fonts may be set at symbol 33. The themes may be previewed at symbol 34, and at symbol 35. The themes may be saved to the XML file at symbol 29. At symbol 36, the new themes may be applied.

To reiterate, an arrow from symbol 29 to symbol 31 may indicate that symbol 31 uses the theme (xml) info from 29 to apply to the supervisor at symbol 28. Symbol 26 may just read the symbol 29 theme (xml) to know if it exists or not. If it exists, then there is a custom theme, so the decision may be "Yes" to flow to 31. If the symbol 29 theme (xml) does not exists, the symbol 26 decision may be "No" to flow to symbol 27 to apply default theme settings.

A new menu option may be provided in the tool bar where a user can change the baseline from the old station configuration to a new station configuration. Thus, the next time the user creates a new XCM using the "Add New XCM" menu option in the Opus™ Explorer, the new XCM station configuration may reflect the control strategies and configuration updates added before as the new baseline. One may refer to FIG. 4 relative to a change of the baseline.

Figure 4:
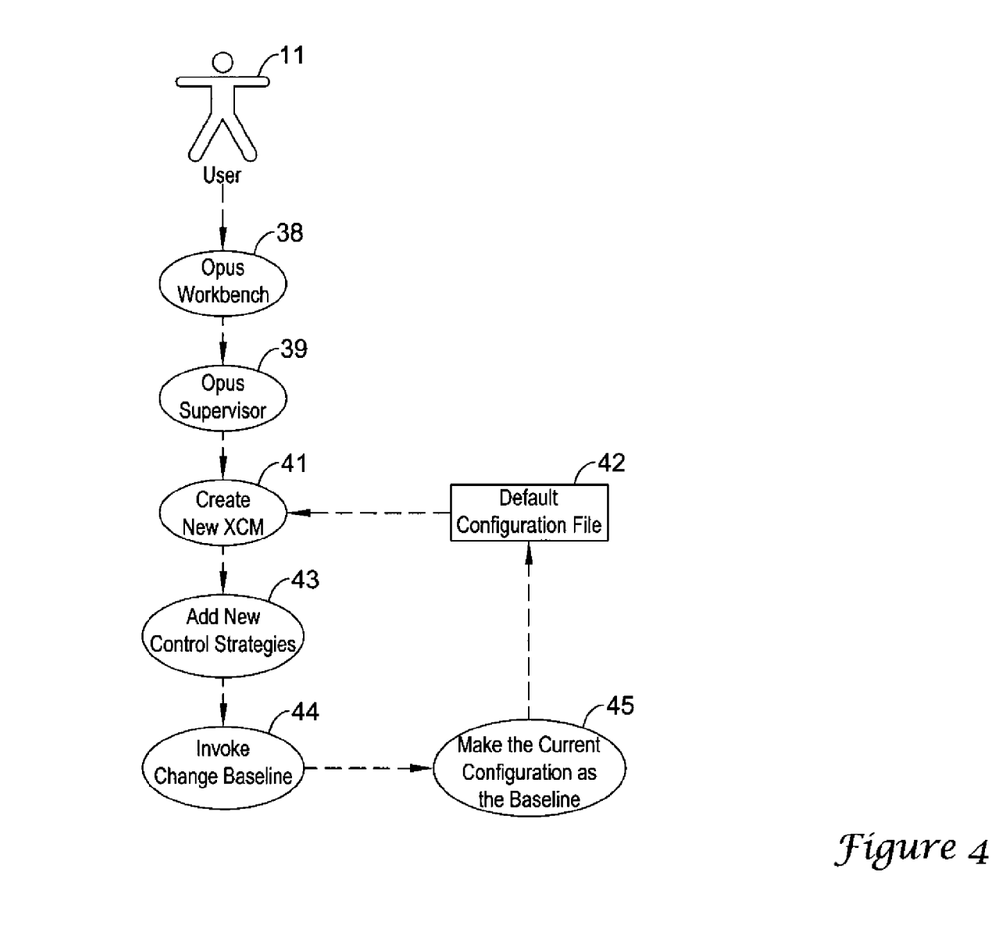
FIG. 4 is a diagram showing an approach for changing a baseline.

FIG. 4 is a diagram showing an approach for changing the Opus™ XCM station baseline. User 11 may go to the Opus™ Workbench at symbol 38 and then to the Opus™ Supervisor at symbol 39. A new XCM may be created at symbol 41 with a default configuration file from symbol 42. At symbol 43, new control strategies and configuration updates may be added to the just created XCM station. From there, the user invokes the change baseline menu item may occur at symbol 44. At symbol 45, the current select XCM station configuration may be made as the new default XCM station baseline. The configuration may be kept as the default configuration file at symbol 42.

Figure 5A:
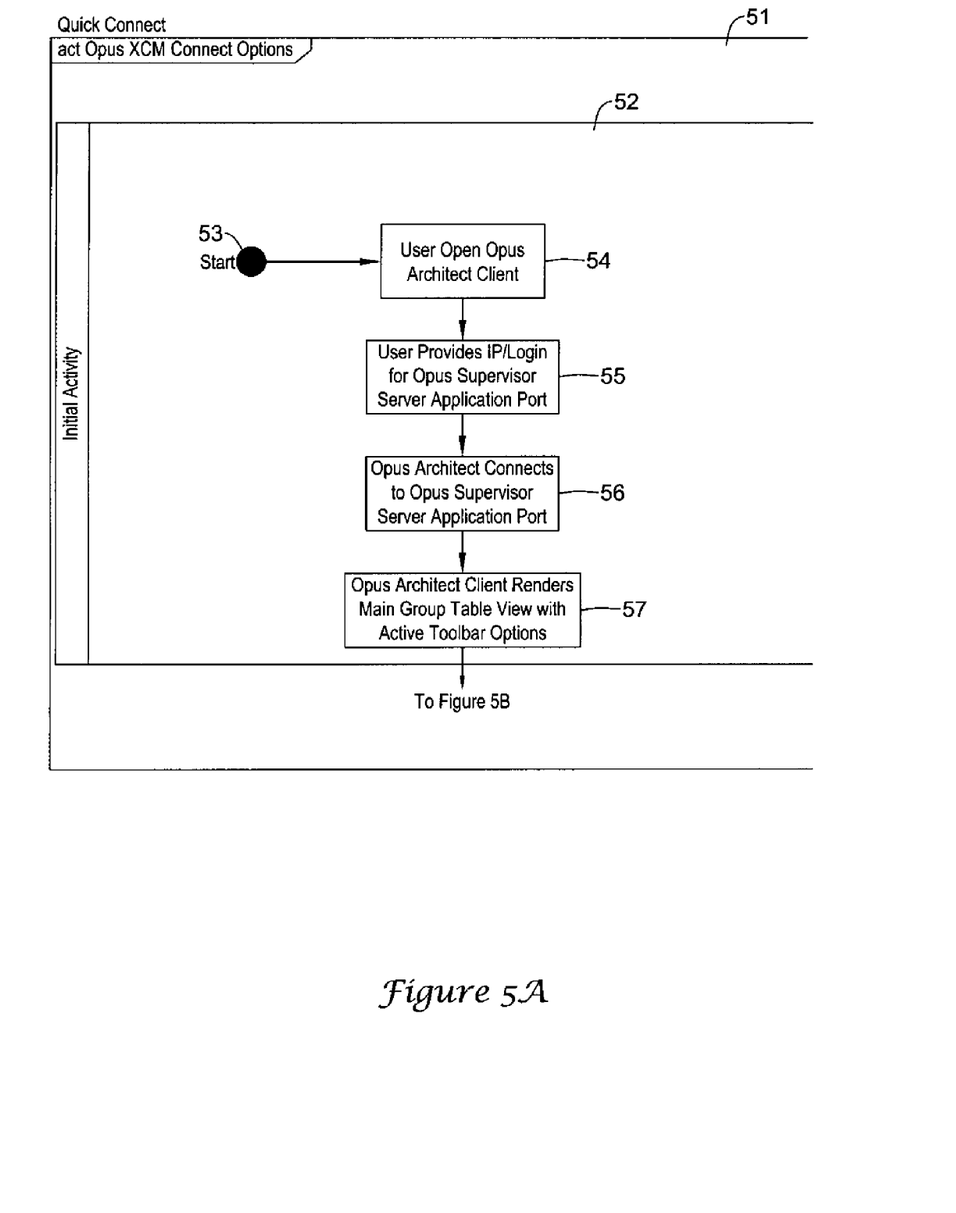
FIG. 5 is a more detailed flow diagram for a quick connect.
Figure 5B:
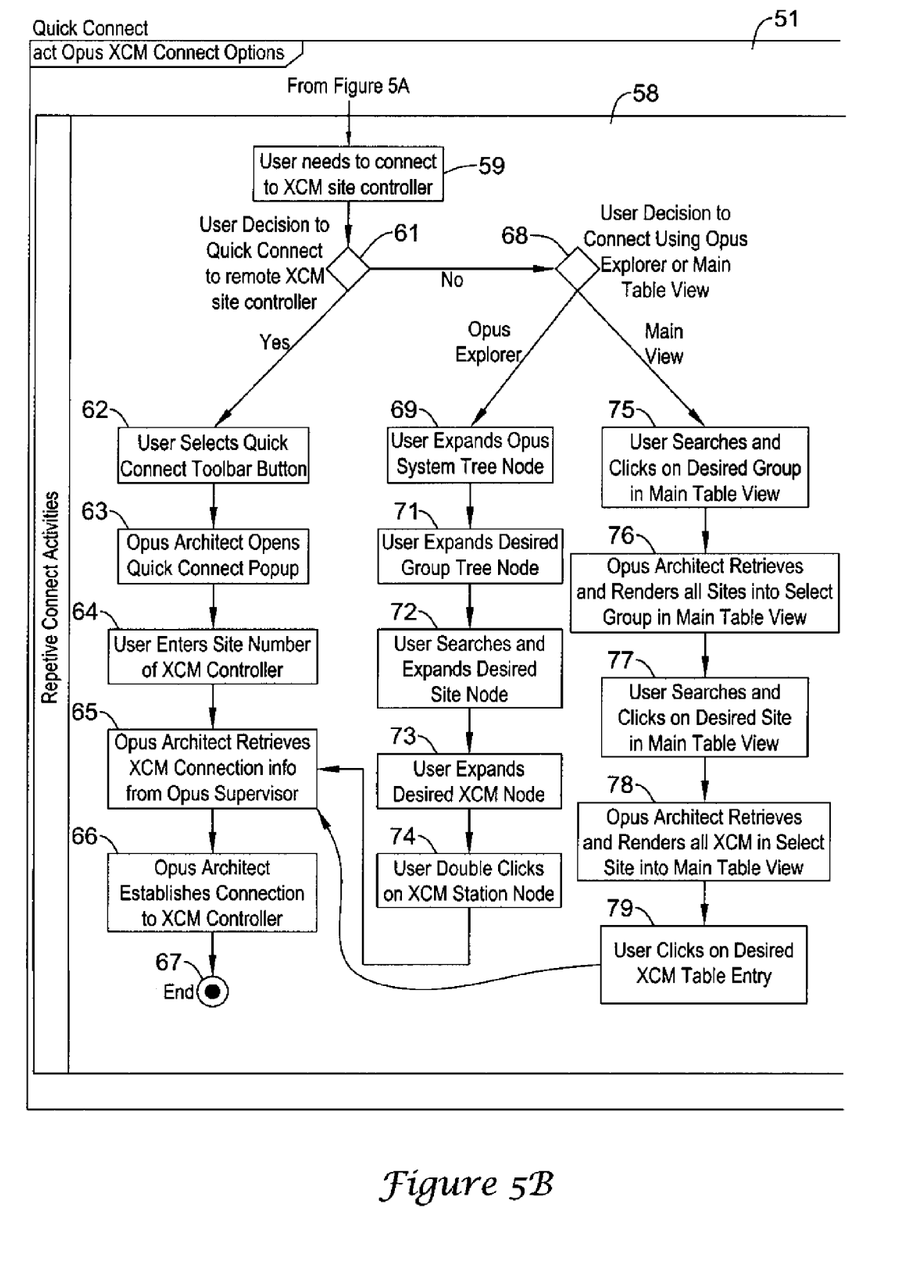

FIG. 5 is a flow diagram 51 for a quick connect approach. Steps or blocks in the diagram may be referred to as symbols. In an initial activity block 52, at a start 53, a user may open an Opus™ Architect client at symbol 54. At symbol 55, the user may provide an IP/login for an Opus™ Supervisor server application port. The Opus™ Architect may connect to the Opus™ Supervisor application port at symbol 56. The Opus™ Architect client may render a main group table view with active toolbar options at symbol 57.

At symbol 59, after symbol 57, in a repetitive connect activities block 58, the user may need to connect to an XCM site controller at symbol 59. After this, a question as to a user's decision to quick connect to a remote XCM site controller may be asked at symbol 61. If an answer is yes, then the user may select a quick connect toolbar button at symbol 62. At symbol 63, the Opus™ Architect may open up a quick connect popup. The user may enter a site number of the XCM controller at symbol 64. At symbol 65, the Opus™ Architect may retrieve XCM connection information from the Opus™ Supervisor. The Opus™ Architect may establish a connection to the XCM controller at symbol 66 which results in an end at symbol 67.

Returning to the question at symbol 61 as to the user's decision to quick connect to a remote XCM site controller may be with an answer of no. With this answer, another question at symbol 68 is a user's decision whether to connect using an Opus™ Explorer or a main table view. If an answer is to use the Opus™ Explorer, then the user may expand an Opus™ System tree node at symbol 69. At symbol 71, the user may expand a desired Opus™ Group tree node. The user may search and expand a desired site node at symbol 72. At symbol 73, the user may expand a desired XCM node. The user may double click on an XCM station node at symbol 74. At symbol 65, the Opus™ Architect may retrieve XCM connection information from the Opus™ Supervisor. The Opus™ Architect may establish a connection to the XCM controller at symbol 66 and end at symbol 67.

Another answer to the question at symbol 68 may be for a user to connect using a main table view. The user may search and click on a desired group in the main table view at symbol 75. At symbol 76, the Opus™ Architect may retrieve and render all sites into a select group in the main table view. The user may search and click on a desired site in the main table view at symbol 77. At symbol 78, the Opus™ Architect may retrieve and render all XCMs in the select site into the Main table view. The user may click on a desired XCM table entry at symbol 79. Then at symbol 65, the Opus™ Architect may retrieve XCM connection information from the Opus™ Supervisor. The Opus™ Architect may establish a connection to the XCM controller at symbol 66 and end at symbol 67.

Figure 6A:
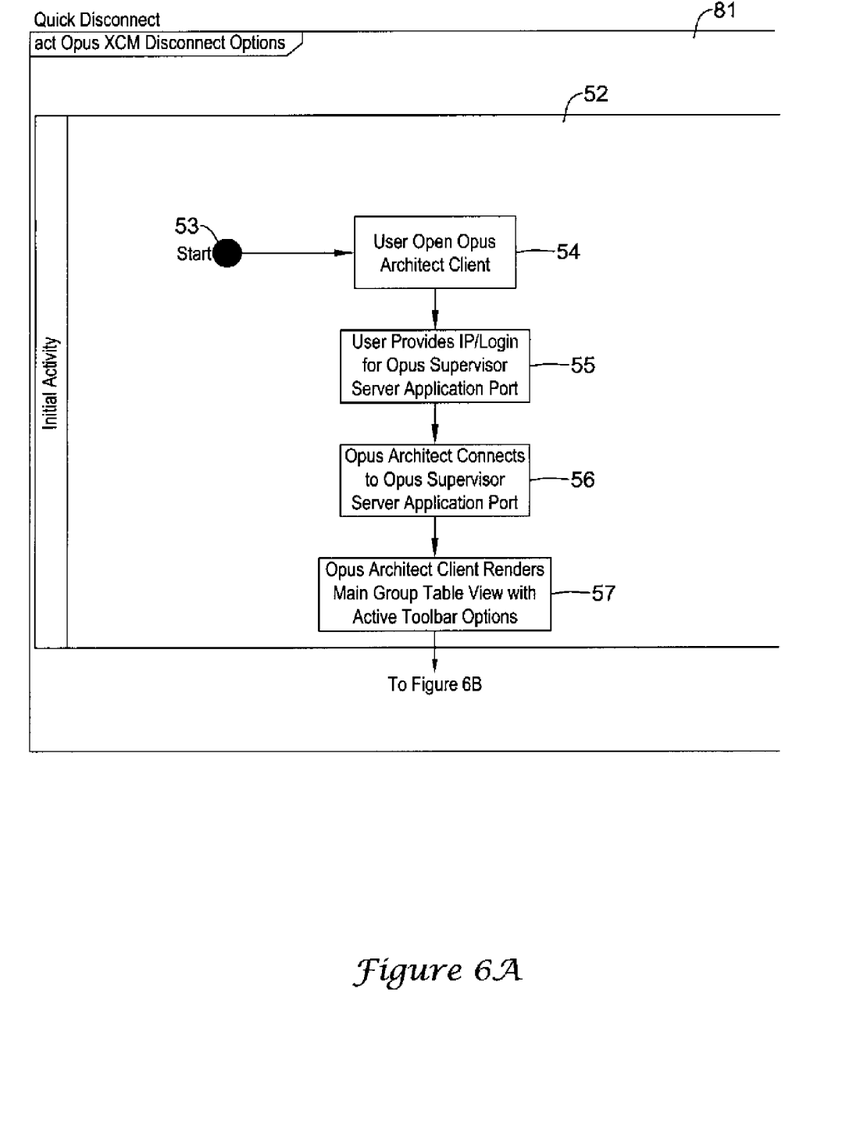
FIG. 6 is a more detailed flow diagram for a quick disconnect.
Figure 6B:
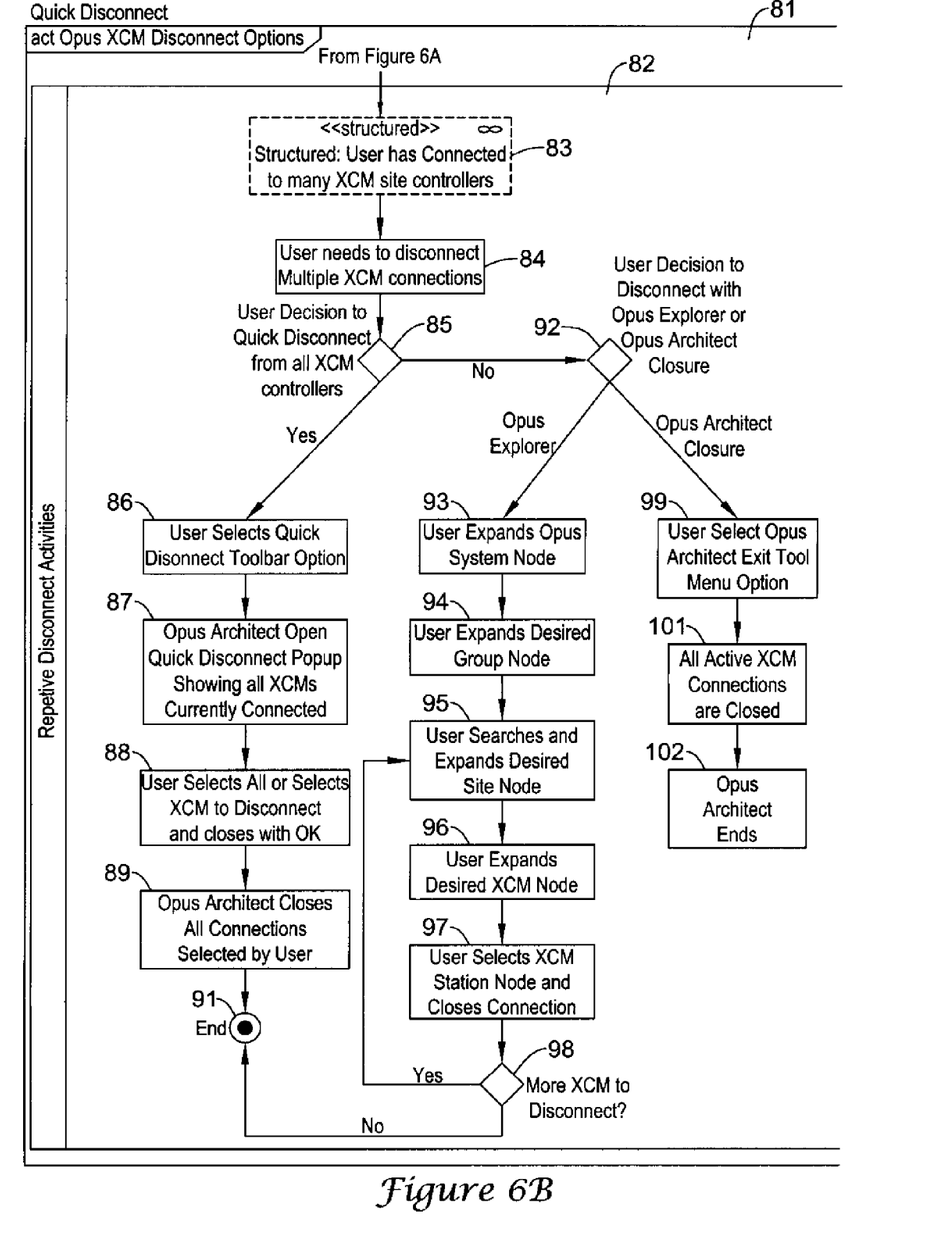

FIG. 6 is a flow diagram 81 for a quick disconnect approach. In an initial activity block 52, at a start 53, a user may open an Opus™ Architect client at symbol 54. At symbol 55, the user may provide an IP/login for an Opus™ Supervisor server application port. The Opus™ Architect may connect to the Opus™ Supervisor application port at symbol 56. The Opus™ Architect client may render a main group table view with active toolbar options at symbol 57.

From initial activity block 52, the quick disconnect approach may continue on into a repetitive disconnect activities block 82. At symbol 83, it is noted that the user has been connected to many XCM controllers. The user needs to disconnect multiple XCM connections as indicated at symbol 84. At symbol 85, a question is whether the user decision is to quick disconnect from all XCM controllers. If an answer is yes, then the user may select a quick disconnect toolbar option at symbol 86. At symbol 87, the Opus™ Architect may open a quick disconnect popup showing all of the XCMs currently connected. The user may select all or select an XCM to disconnect and close an OK at symbol 88. The Opus™ Architect may close all connections selected by the user at symbol 89 and end at symbol 91.

If an answer to the question, at symbol 85, whether the user decision is to quick disconnect from all XCM controllers, is no, then a question at symbol 92 may be whether a user decision to disconnect is to be with an Opus™ Explorer or Opus™ Architect closure. If the answer is the Opus™ Explorer, then the user may expand the Opus™ Systems node at symbol 93. At symbol 94, the user may expand a desired group node. Then the user may search and expand a desired site node at symbol 95. At symbol 96, the user may expand a desired XCM node. The user may select an XCM station node and close the connection at symbol 97. Then at symbol 98, a question is whether there are any more XCMs to disconnect. If the answer is yes, then the user may again search and expand the desired site node at symbol 95, expand a desired XCM node at symbol 96 and select an XCM station node and close the connection at symbol 97. Again the question at symbol 98 may arise and if the answer is yes, then the activity indicated at symbols 95-97 may be repeated for disconnecting another XCM. If the answer is no, then this approach may end at symbol 91.

If an answer to the question at symbol 92 is that the user decision is to disconnect with the Opus™ Architect, then the user may select an Opus™ Architect exit to menu option at symbol 99. All active XCM connections may then be closed at symbol 101 and the Opus™ architect closed at symbol 102.

Figure 7:
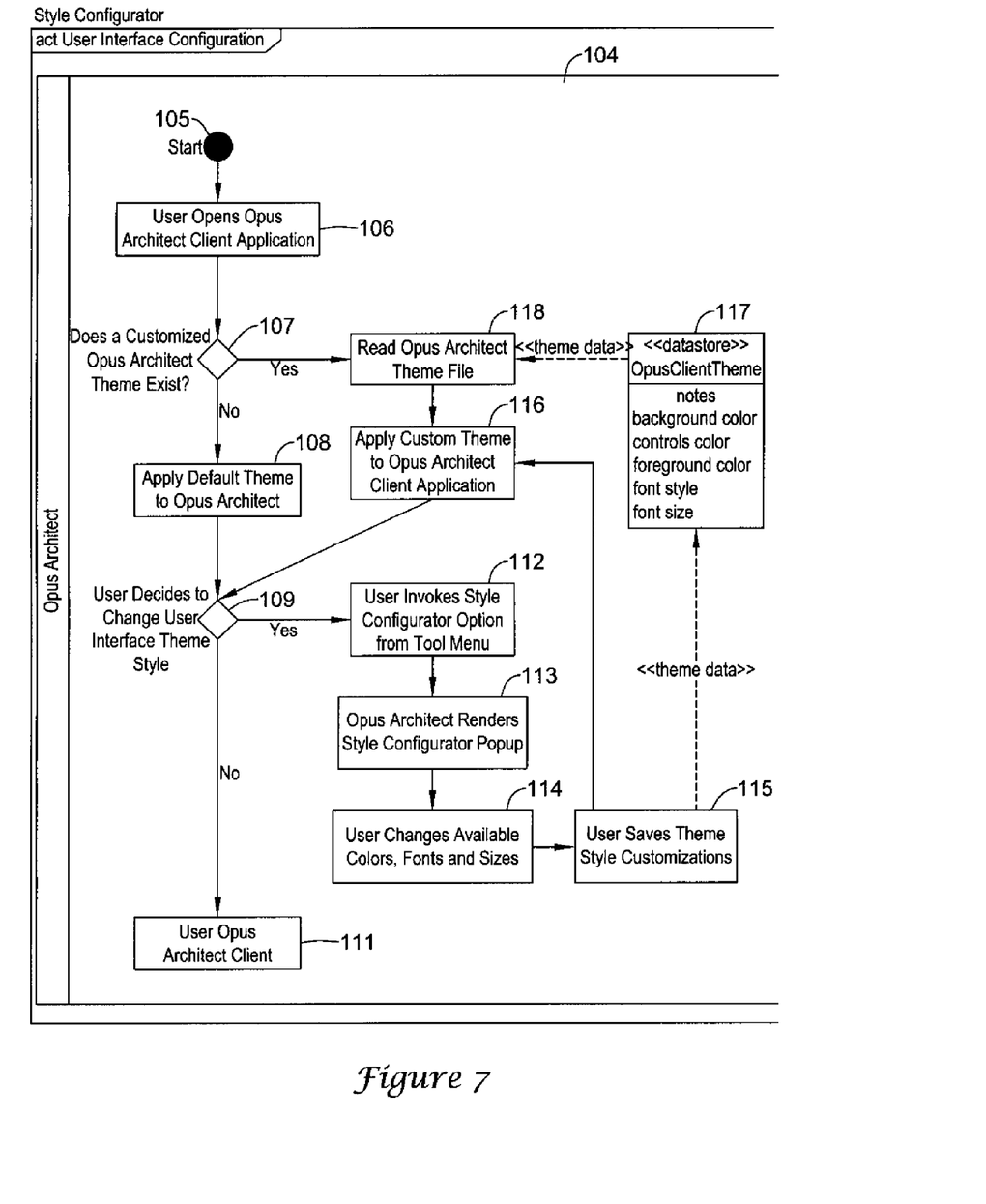
FIG. 7 is a flow diagram of an user interface console for a style configurator.

FIG. 7 is a flow diagram 104 of an Opus™ Architect for a style configurator. From a start at symbol 105, a user may open an Opus™ Architect client application at symbol 106. At symbol 107, a question is whether a customized Opus™ Architect theme exists. If an answer is no, then a default theme may be applied to the Opus™ Architect at symbol 108. At symbol 109, a question is whether the user decides to change a user interface theme style. If the answer is no, then the Opus™ Architect client may be used at symbol 111. If the answer is yes at symbol 109, then the user may invoke a style configurator option from a tool menu at symbol 112. The Opus™ Architect may render a style configurator popup at symbol 113. At symbol 114, the user may change available colors, fonts and sizes. The user may save theme style customizations at symbol 115. At symbol 116, custom themes may be applied to an Opus™ Architect client application. The question at symbol 109 may asked again. The question may be answered with a no which leads to using an Opus™ Architect client at symbol 111. The question at symbol 109 may again be answered with a yes which leads to the activities at symbols 112, 113, 114, 115 and 116. After the activity at symbol 116, the question at symbol 109 may be answered with a no, which can lead to again using the Opus™ Architect client at symbol 111. If the question at symbol 109 is answered with a yes, then the activities at symbols 112, 113, 114, 115 and 116 may be again repeated. At symbol 115, theme data may be saved at data store 117 and labeled as an Opus™ client theme. The data may include background color, controls color, font style, font size, and so forth.

Returning to the question at symbol 107 whether a customized Opus™ Architect theme exists, the answer may be yes, which leads to reading an Opus™ Architect theme file at symbol 118. Theme data may be received at symbol 118 from the data store at symbol 117. After reading the theme file at symbol 118, then the custom theme may be applied to the Opus™ Architect client application at symbol 116. After application of the custom theme at symbol 116, the question at symbol 109 of whether the user decides to change the user interface style may be asked again. If the answer is no, then the Opus™ Architect client may be used. If the answer is yes, then the activities at symbols 112, 113, 114, 115 and 116, as noted herein, may be repeated.

Figure 8A:
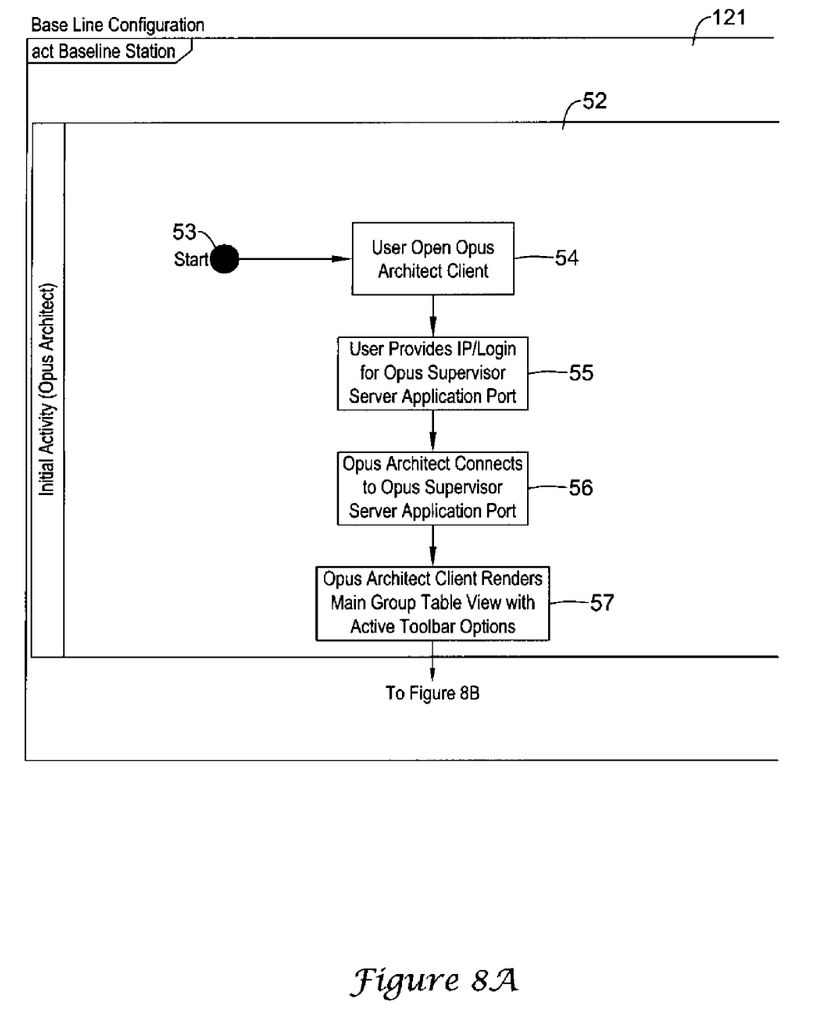
FIG. 8 is a more detailed flow diagram for a baseline configurator.
Figure 8B:
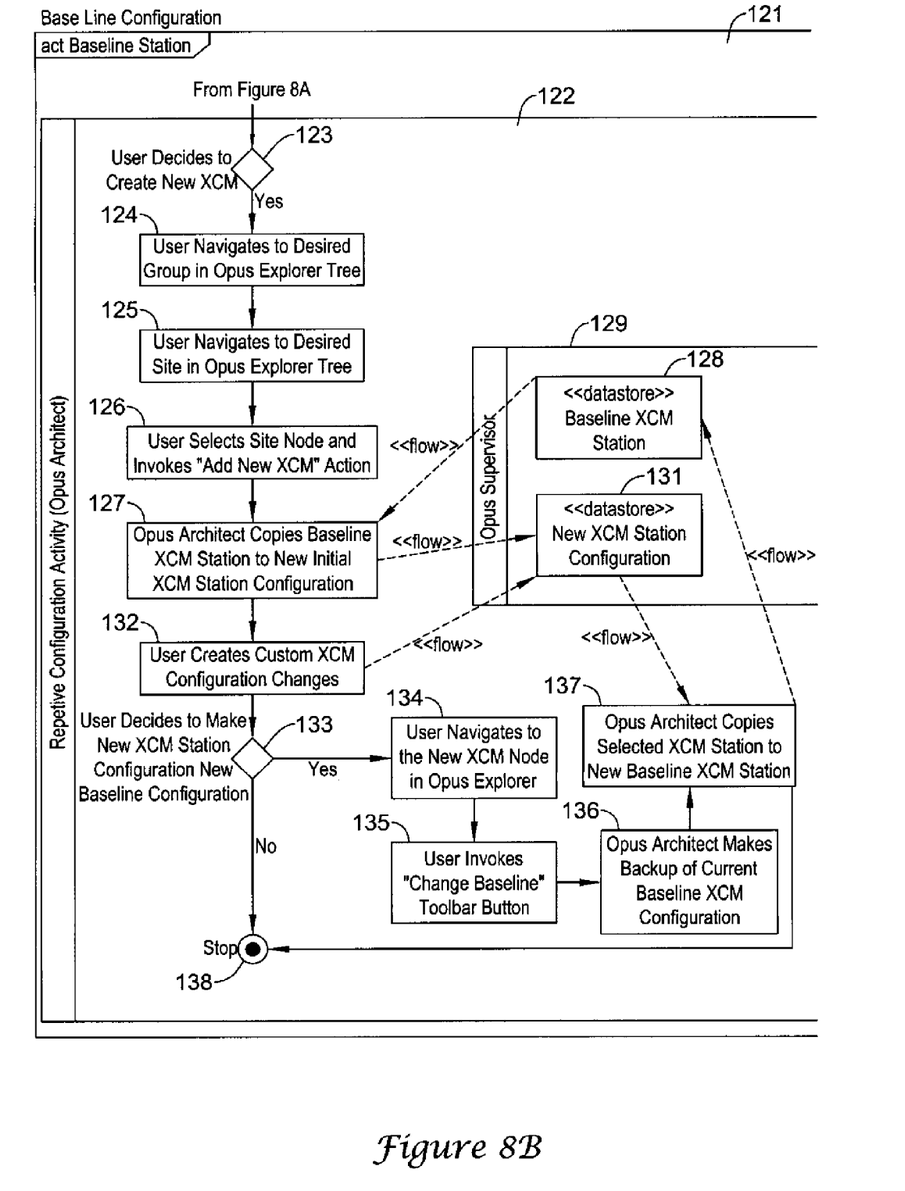

FIG. 8 is a flow diagram 121 for a baseline configuration approach. In an initial activity block 52, at a start 53, a user may open an Opus™ Architect client at symbol 54. At symbol 55, the user may provide an IP/login for an Opus™ Supervisor server application port. The Opus™ Architect may connect the Opus™ Supervisor application port at symbol 56. The Opus™ Architect client may render a main group table view with active tool bar options at symbol 57.

From symbol 57 in the initial activity block 52, symbol 123 with a question whether a user decides to create a new XCM, may follow in a repetitive configuration block 122. If an answer to the question is no, then the approach may stop. If the question at symbol 123 is yes, then a user may navigate to a desired group in an Opus™ Explorer tree at symbol 124. At symbol 125, the user may navigate for a desired site in an Opus™ Explorer tree. The user may select a site node and invoke an "Add New XCM" action at symbol 126. At symbol 127, the Opus™ Architect may copy a baseline XCM station to a new initial XCM station configuration. Baseline XCM station data may flow from a data store 128 in Opus™ Supervisor 129. At symbol 127, the Opus™ Architect may copy a baseline XCM station from a data store at symbol 128 in the Opus™ Supervisor at block 129 to a new initial XCM station configuration. The new XCM station configuration may be stored in a data store at symbol 131 of the Opus™ Supervisor. At symbol 132, the user may create custom XCM configuration changes which may be stored as the new XCM station configuration in the data store at symbol 131.

A question of whether the user decides to make a new XCM station configuration as a new baseline configuration may be asked at symbol 133. If the answer is no, then the approach may stop at symbol 138. If the answer is yes, then the user may navigate to the XCM node in an Opus™ Explorer at symbol 134. At symbol 135, the user may invoke a "Change Baseline" toolbar button. The Opus™ Architect may make a backup of the current baseline XCM configuration at symbol 136. At symbol 137, the Opus™ Architect may copy a selected XCM station to a new baseline XCM station. A copy of the new XCM station configuration from the data store at symbol 131 may go to the Opus™ Architect at symbol 137 and a copy of the new baseline XCM station may go to the data store at symbol 128. After symbol 137, the approach may stop at symbol 138.

Some of the terms utilized herein may have corresponding designations as noted in the following: XCM station—site controller configuration; XCM auto discover service—site controller auto discovery service; XCM—site controller; Opus™ XCM—site controller; Opus™ workbench—user interface (console); Opus™ systems—enterprise site controllers (multi-site); Opus™ supervisor station—supervisor data server; Opus™ supervisor server—supervisor data server; Opus™ supervisor—supervisor; Opus™ group—site groups; Opus™ explorer—site navigation tree; Opus™ architect client—user interface (console); Opus™ architect—user interface (console); Opus™—building management system (BMS); Niagara™ Workbench™ user interface (console); Niagara™ Network™ communication network; enterprise components—enterprise hierarchal elements; and enterprise—enterprise (business or customer) building site locations (all multi-site).

U.S. patent application Ser. No. 12/260,046, filed Oct. 28, 2008, and entitled "A Building Management Configuration System", may be pertinent to the present disclosure. U.S. patent application Ser. No. 12/260,046, filed Oct. 28, 2008, is hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for a quick disconnect comprising:
   opening a user interface console;
   providing a login for a supervisor server application port;
   the user interface console connecting to the supervisor server application port;
   the user interface console rendering a main group table view with active toolbar options for disconnecting from virtually all site controllers, less than virtually all site controllers, or virtually no site controllers; and
   wherein:
   disconnecting from virtually all site controllers, less than virtually all site controllers, or virtually no site controllers comprises selecting a disconnect toolbar option from the active toolbar options to open a quick disconnect popup showing virtually all of the currently connected site controllers;
   disconnecting from less than virtually all site controllers comprises disconnecting from less than virtually all site controllers via a site navigation tree node; and
   disconnecting from less than virtually all site controllers via a site navigation tree node comprises:
   expanding an enterprise site controllers node;
   expanding a desired group node;
   searching for a desired site node;
   expanding the desired site node;
   expanding a desired site controller node;
   selecting a site controller configuration node; and
   closing a connection of the site controller configuration node.

2. The method of claim 1, wherein disconnecting from virtually all site controllers comprises:
   selecting virtually all or selected site controllers for disconnection and closing with an accept action; and
   the user interface console closing virtually all connections selected by the user.

3. The method of claim 1, wherein:
   disconnecting from less than virtually all site controllers comprises disconnecting from less than virtually all site controllers via a site navigation tree node; and
   disconnecting from less than virtually all site controllers via a site navigation tree node comprises further disconnecting one or more site controllers.

4. The method of claim 3, wherein further disconnecting one or more site controllers comprises:
   searching for another desired site node;
   expanding the other desired site node;
   expanding another desired site controller node; and
   selecting another site controller configuration node; and
   closing a connection of the other site controller configuration node.

5. The method of claim 1, wherein:
   disconnecting from virtually no site controllers comprises disconnecting from virtually no site controllers via a user interface console closure; and
   disconnecting from virtually no site controllers via a user interface console closure comprises:
   selecting a user interface console exit tool menu option; and
   closing all active site controller connections.

6. A method for a quick connect to a site controller, the method comprising:
   opening a user interface console;
   providing a login for a supervisor server application port at the user interface console, the user interface console connecting to the supervisor server application port and rendering a main group table view with active toolbar options;
   selecting a quick connect toolbar button from the active toolbar options causing the user interface console to open a quick connect popup to connect a site controller by entering a site number;
   entering a site number of a site controller in the quick connect popup; and
   connecting to at least one controller via a remote connection; and
   wherein:
   connecting to at least one controller via a remote connection comprises using the entered site number of a site controller to retrieve the site controller connection information from the supervisor server and establish a connection to the site controller with the retrieved site controller connection information from the supervisor server;
   connecting to at least one controller via a site navigation tree comprises establishing an initial connection to a site controller using the user interface by:

expanding an enterprise site controller tree node;
expanding a desired group tree node;
searching a desired site node,
expanding the desired site node;
expanding a desired site controller node;
double clicking on a site controller configuration node;
the user interface console retrieving site controller connection information from a supervisor and establishing a connection to a site controller; and
storing a group number and a site controller number associated with the connected site controller in a data store.

7. The method of claim 6, wherein connecting to at least one controller via a remote connection comprises:
retrieving a group number and/or a controller number from a data store, wherein the group number and/or the controller number are obtained from an initial connection to the site controller.

8. The method of claim 6, wherein connecting to at least one controller via a main table view comprises:
searching and clicking on a desired group in a main table view;
the user interface console retrieving and rendering virtually all sites into a select group in the main table view;
searching and clicking on the desired site in the main table view;
the user interface console retrieving and rendering virtually all site controllers in a selected site into the main table view;
clicking on a desired site controller table entry;
the user interface console retrieving site controller connection information from a supervisor; and
the user interface console establishing a connection to a site controller.

* * * * *

UNITED STATES PATENT AND TRADEMARK OFFICE
CERTIFICATE OF CORRECTION

PATENT NO. : 8,819,562 B2  
APPLICATION NO. : 12/895609  
DATED : August 26, 2014  
INVENTOR(S) : Nair et al.

Page 1 of 1

It is certified that error appears in the above-identified patent and that said Letters Patent is hereby corrected as shown below:

On the Title Page  
Item 75, delete "Sundaramoorthi Jhangavel", and insert --Sundaramoorthi Thangavel--.

Signed and Sealed this  
Twenty-first Day of October, 2014

Michelle K. Lee  
*Deputy Director of the United States Patent and Trademark Office*